United States Patent [19]

Roox

[11] Patent Number: 4,918,112
[45] Date of Patent: Apr. 17, 1990

[54] ADHESIVE FOAMS

[75] Inventor: Guillaume J. Roox, Antwerp, Belgium

[73] Assignee: Exxon Chemical Patents Inc., Linden, N.J.

[21] Appl. No.: 269,214

[22] Filed: Nov. 9, 1988

[30] Foreign Application Priority Data

Nov. 9, 1987 [GB] United Kingdom ................. 8726201

[51] Int. Cl.$^4$ ............................ C08J 9/00; B32B 3/26
[52] U.S. Cl. ................................. 521/134; 428/318.4;
428/319.1; 428/319.3; 428/319.7; 521/142;
521/144

[58] Field of Search ............... 428/319.7, 318.4, 319.1,
428/319.3; 521/134, 142, 144

[56] References Cited

U.S. PATENT DOCUMENTS 3,686,067  8/1972  Williams .......................... 428/319.7
3,979,540  9/1976  Moffett ............................ 428/319.7

Primary Examiner—William J. Van Balen
Attorney, Agent, or Firm—J. F. Hunt

[57] ABSTRACT

An adhesive foam comprises a foamed mixture of a foamable homo- or co-polymer and a foamable olefin-unsaturated carboxylic acid copolymer, the mixture containing at least 3 weight percent of polymer units derived from the acid.

7 Claims, No Drawings

ADHESIVE FOAMS

This invention relates to polymeric foams, to laminates comprising such foams applied to a substrate, and to a method of producing such laminates.

It is known in the art to produce laminates comprising foamed sheets adhered to substrates, where the adhesion is effected by means of an adhesive layer applied between the foam sheet and the substrate. More specifically, it is common to adhere foamed LDPE sheets, for example having a density of about 20 kg/m$^3$, to substrates such as wood, paper, textiles and aluminum foil, by using an adhesive system comprising hot melts, glues or adhesive films. Clearly such laminates are complicated to produce on a continuous basis, since they require application of the adhesive layer to the substrate or to the foam sheet or both.

Foam materials have been made containing styrene as a principal monomer and/or cross-linked chemically by co-valent bonds (see EP 134501; GB 1345975; GB 1,189.505; US 4567209 and GB 1044680). GB 1517463 describes the production of non-cross-linked foams based on blends of styrene containing resin with ionomers with liquid blowing agents of the Freon type, to give improved mechanical properties and processability.

Styrene is olefinic but has aromaticity and is regarded as polar. As used herein the term "olefinic substantially non-aromatic homo- or copolymer" refers to a polymer which is substantially devoid of styrene. A polymer can be regarded as being substantially devoid of styrene if it contains such low content that the polymer material is resistant to multiple impacts and has good elastic recovery. The term "copolymer" includes polymers derived of two or more monomers. There is no indication in the above publications that heat lamination could be performed without a specific additional adhesive layer.

According to a first aspect of the present invention there is provided a polymeric foam comprising a foamed mixture of components (a) and (b) in a ratio by weight of from 5:95 to 95:5, (a) being a foamable olefinic substantially non-aromatic homo- or co-polymer and (b) being a foamable olefin-unsaturated carboxylic acid copolymer, optionally partially neutralized, the said foamed mixture comprising at least 3 weight percent of polymer units derived from the unsaturated carboxylic acid.

It is believed that generally substantially non-aromatic polymers such as LDPE and polar polymers such as olefin-unsaturated carboxylic acid copolymers show poor compatibility in straight blends and in resultant films. Surprisingly, though, foams produced from such blends contain a low proportion of polar units and do not appear to suffer from the phase separation phenomena. Component (a) may be, for example polyolefinic non-aromatic plastics materials such as polyethylene or polypropylene, or polyolefinic elastomer materials such as ethylene-higher alpha olefin copolymer elastomers or ethylene-higher alpha olefin-polyene, preferably diene, terpolymers, most preferably EPM or EPDM. Component (a) may comprise a polar monomer such as for example ethylene-unsaturated ester copolymers such as ethylene-vinylacetate (EVA) or ethylene-methylacrylate (EMA). It is particularly preferred, though, that component a) is a crystalline thermoplastics material substantially devoid of polar units such as LDPE. Preferably the crystalline thermoplastics material has a melt index of from 0.1 to 250, more preferably from 0.3 to 15. Styrene or other aromatic monomers should be absent or be below 15%, especially 10% or even 5% by weight of the total weight of component (a).

In a second aspect of the invention there is provided a foamed non-homogeneous mixture of components (a) and (b) in a ratio by weight of from 5:95 to 95:5, (a) being a foamable olefinic non-aromatic homo or copolymer and (b) being a foamable olefin-unsaturated carboxylic acid copolymer, optionally partially neutralized, the said foamed mixture comprising at least 3% by wt of polymer units derived from unsaturated carboxylic acid, (a) having a VICAT softening point at least 5° C. higher than that of (b) so as to permit adherence when heated on one side, without foam collapse under pressure.

Component (b) is a foamable ethylene-unsaturated carboxylic acid copolymer or a partially ionomerised derivative thereof, such as ethylene-acrylic acid copolymer (EAA) or ethylene methacrylic acid copolymer (EMAA) or fumaric acid or citaconic acid. It preferably has a melt index of from 0.1 to 500, more preferably from 2 to 100. However the copolymer may be used in the form of a wax such as EAA wax or EMAA wax, in which case it is preferred that the wax has a melt index up to 4500. Instead of being a straight two-monomer derived copolymer component (b) may also be a copolymer with and additional or third co-monomer which comprises an unsaturated carboxylic acid ester or a blend. Preferably such third co-monomer is methyl acrylate or vinyl acetate. The copolymer (b) may be a conventional backbone polymer, although it is also contemplated that such copolymer may be a graft copolymer wherein one monomer is grafted to the backbone polymer of the other monomer(s), for example with maleic anhydride.

It is also preferred that the resin mixture of (a) and (b), from which the polymeric foam is produced, has a melt index of from 0.1 to 500, more preferably from 0.3 to 100. Melt index values as a specified herein are measured in accordance with ASTM-D1238, at 2.16 kg/190° C.

The blend ratio of component (a) and (b) in the polymeric foam can be wide ranging, provided that the final foam contains at least 3 weight percent of polymer units derived from the unsaturated carboxylic acid entity. Such acid entity may be acrylic acid or methacrylic acid, and the comonomer to be polymerized therewith is preferably ethylene, although for example C3 to C5 comonomers are possible. Component (b) preferably contains at least 2 weight percent of the acid units, more preferably at least 5 weight percent and most preferably at least 10 weight percent, and the blend of (a) and (b) is more preferably in the range 40:60 to 70:30. Relative costs and adhesion properties in the final foam will act as determinant for the particular blend which is selected, but it has been found that foamed mixtures having less than 3 weight percent of polymer units derived from the acid are ineffective in improving adhesion to substrates. The actual proportion of acid derived units which is preferred can be readily assessed by simple adhesion (peel strength) tests, and depends on the nature of the substrate and the other properties which high acid polymer unit concentrations may bring to the foamed mixture. Preferably the proportion of polymer units in the foamed mixture which are derived from the unsaturated carboxylic acid entity is greater than 5 weight percent.

As mentioned, component (a) is a foamable, non-aromatic polymer, which may be crystalline or amorphous, plastics or elastomeric. It is desirable that component (a) provides a structural integrity to the final foam composition, even when such composition is subjected to heat treatment. Thus in the case where component (a) is a plastics material, it should preferably gave a VICAT softening temperature which is higher than that of component (b).

To facilitate production of the foamed polymer, the melt index of component (b) should be sufficiently high to permit dispersion within component (a), and foaming.

Inferior blend properties, due to the incompatibilty of the components blended appears to be avoided. Films produced from such blends generally have worse mechanical and optical properties than straight LDPE. However it has now surprisingly been found that blends of (a) and (b), particularly LDPE and EAA when used in the production of foams, give surprisingly good quality foams. Generally, low density foams are commercially desirable, for example in the 15 to 200 kg/m³ range, and it has been found that such foamable compositions as hereinbefore defined when constituting such foams, generally having good cushioning and insulation (heat and sound) properties, together with well maintained cell sizes and mechanical properties such as tensile strength, flexibility, rigidity and tear strength. The polymeric foams of the invention generally may have physical properties which are comparable as films foamed from the base polymer component (a). Foams of density as low as 20 kg/m³ and thickness as low as 1 mm have been produced and shown to have these good properties.

Wave formation on the surface of the foamed product produced following extrusion in machine direction, may be reduced, facilitating subsequent heat lamination.

The actual technique used to produce the foam forms no part of this invention, since well known chemical blowing agent or gas expansion techniques may be used to convert the resin mixture to the polymeric foam. It is well within the skill of the art to employ conventional foaming techniques to generate the polymeric foams of the invention containing the designated components (a) and (b).

According to a further aspect of the invention there is provided a method of producing a laminate comprising a substrate having a foam firmly adhered thereto, which method comprises applying to the substrate, in the substantial absence of any added adhesive layer, an adhesive polymeric foam as described previously, said foam being adapted in shape to suit the surface of the substrate, so forming a composite; and subjecting the composite to hot pressing, followed by cooling, the hot pressing being performed at a pressure lower than the compression set pressure of the foam at the applied temperature, and at a temperature lower than that which would result in substantial collapse or deformation of the foam.

Cooling of the hot pressed laminate may be natural or may be by, for example, an airjet. Typically a hot press temperature which is greater than the VICAT softening point of component (b) but lower than the melting point of component (a) is used, for example from 15° to 110° C., more preferably from 65° to 90° C. The hot press pressure is of course required to be less than the compression set pressure of the foam (at the hot press temperature), otherwise the foam would permanently deform. In one embodiment, application of the foam to the substrate takes place on a continuous line, for example at a rate of 20 m/minute. A hot press time of 1 to 10 seconds is preferred, and preferably cooling is by air convection. To produce a consistent product, temperature and pressure conditions are selected such that the foam does not collapse, shrink or otherwise deform during the hot press stage.

It has been found that the polymeric foams of the invention may be laminated to a variety of substrates without the use of an adhesive layer. The hot press technique generally gives adhesion values to the substrate at least as good as those which may be obtained by the use of a conventional adhesive (hot melts, glues, adhesive films). The substrate may be for example wood, paper, textiles, both wovens and non-wovens, metals, such as aluminum foil, or polymers such as polyamides or polyurethanes. Generally such substrates are believed to have a polarity, for example with metals through an oxide layer on the surface. Laminates formed with paper or aluminium foil as substrate have particular commercial advantage. The laminates of the invention, when produced by the method described above, form useful heat and/or sound insulating and/or shock protecting structures which readily find application in the building, packaging and other industries. For example such laminates may be used to constitute a cushioned structure having a paper substrate and being in the form of an envelope with cushioning properties.

The polymer foam composition of the invention may of course contain additives which re conventionally used in foam production, such as nucleating agents, processing aids such as glycerol monostearate, flame retardants, pigments, fillers etc.

The non-aromatic polymer may only have a small comonomer content or can be used without comonomer giving higher VICAT softening points. The polymer can thus be of low cost yet impart the strength to resist lamination pressure at elevated temperature. The carboxylic acid group containing polymer may have a comonomer content such that there is provided a lower softening points whilst providing good adhesion. Using only a small amount of acid comonomer foams can be prepared which heat laminate effectively and can also be printed without further surface treatment. The neutralisation of acid groups is not thought to greatly affect the foam performance.

The following examples illustrate the invention.

EXAMPLES

A 50/50 dry blend by weight of components a) and b) as defined above were mixed in a tumble mixer, and the mixture was then transferred to a GLOENCO tandem extruder (Gloucester Engineering Company). Component a) was a low density polyethylene CF2200 supplied by ENICHEM, of melt index 2.0 g/10 minutes. Component b) was an EAA copolymer of melt index 8.0 g/10 minutes and acrylic acid content 11% by weight. The blend was extrusion melted in the extruder and foamed into a foamed sheet of 1mm thickness by expansion with a physical blowing agent. The blowing agent, R 12 fluorochloro carbon, was injected in the form of a liquified gas at 100 to 150 bar into the polymeric melt in the barrel of the extruder, with expansion in the free atmosphere as the melt exited the die. The foamed sheet had a density of 21 kg/m³, and was air cooled on exiting the die, and wounde onto a roll.

By way of comparison, a foam was also produced using the straight LDPE mentioned above, and both the LDPE/EAA polymer foam and the straight LDPE polymer foam were then heat laminated under pressure, at 80° C., for 5 seconds, onto (1) an aluminum foil substrate and (2) a substrate comprising kraft paper of 19 g/m², heat being supplied from the side of the substrate.

The four samples thus produced were subjected to identical peel strength tests, to measure the adhesion of the foamed polymer onto the substrate. For both substrates, the straight LDPE foam gave adhesive failure, whereas the foam according to the invention was so securely adhered to the substrate, that testing led to cohesive failure, that is the substrate failed, rather than the bond between the foam and the substrate.

Use of a separate adhesive system intermediate the substrate and foam is avoided. The foam has mechanical characteristics permitting it to resist multiple mechanical impact.

I claim:

1. A polymeric foam comprising a foamed mixture of polymeric components (a) and (b) in a ratio by weight of from 5:95 to 95:5, (a) being a foamable olefinic substantially non-aromatic homo- or co-polymer devoid of polar units having a melt index of 0.1 to 250 g/10 minutes and (b) being a foamable olefin-unsaturated carboxylic acid copolymer, the said foamed mixture comprising at least 3 weight percent of polymer units derived from the unsaturated carboxylic acid.

2. A foam according to claim 1 wherein (a) comprises polyethylene or polypropylene.

3. A foam according to claim 1 wherein (a) has a melt index from 0.3 to 15 g/10 minutes (ASTM1238, 2.16 KG/190° C.), and wherein (b) has a melt index of from 2 to 100 g/10 minutes.

4. A foam according to claim 3, wherein (b) is an ethylene-acrylic or methacrylic acid copolymer optionally containing an additional co-monomer which comprises an unsaturated carboxylic acid ester.

5. A form according to claim 3 wherein the weight ratio of (a):(b) is from 40:60 to 70:30, wherein the resin mixture of (a) and (b) in the unfoamed state has a melt index of from 0.3 to 100 g/10 minutes, and which has a foamed density of from 15 to 200 kg/m³.

6. A polymer foam comprising a foamed non-homogeneous mixture of components (a) and (b) in a ratio by weight of from 5:95 to 95:5, (a) being a foamable non-aromatic olefinic homo or copolymer devoid of polar units and having a melt index of 0.1 to 250 g/10 minutes and (b) being a foamable olefin-unsaturated carboxylic acid copolymer, the said foamed mixture comprising at least 3% by wt of polymer units derived from unsaturated carboxylic acid component, (a) having a VICAT softening point at least 5° C. higher than that of (b) to permit adherence to a substrate when hot without foam collapse under pressure.

7. A method of producing a laminate comprising a substrate having a foam firmly adhered thereto, which comprises applying to the substrate, in the substantial absence of any added adhesive layer under foam-foaming conditions, an adhesive polymeric foam according to claim 6, said foam being adapted in shape to suit the surface of the substrate, thereby forming a composite, and subjecting said composite to hot pressing followed by cooling, the hot pressing being performed at a pressure lower than the compression set pressure of the foam at the applied temperature, and at a temperature lower than that which would result in substantial collapse or deformation of the foam.

* * * * *